Aug. 8, 1933.    O. OHLSON    1,921,001
PRESSURE GAUGE
Filed Feb. 11, 1929
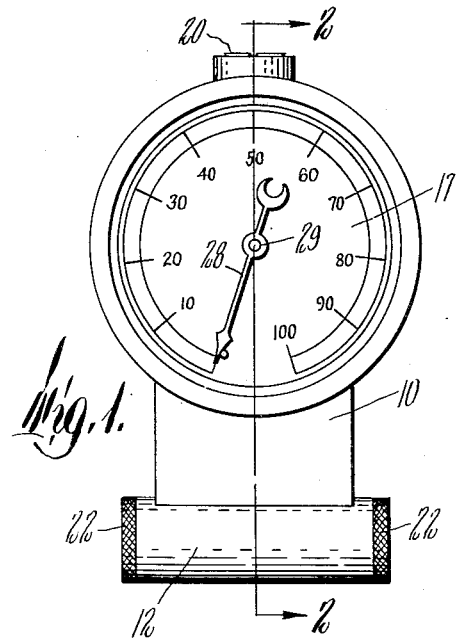
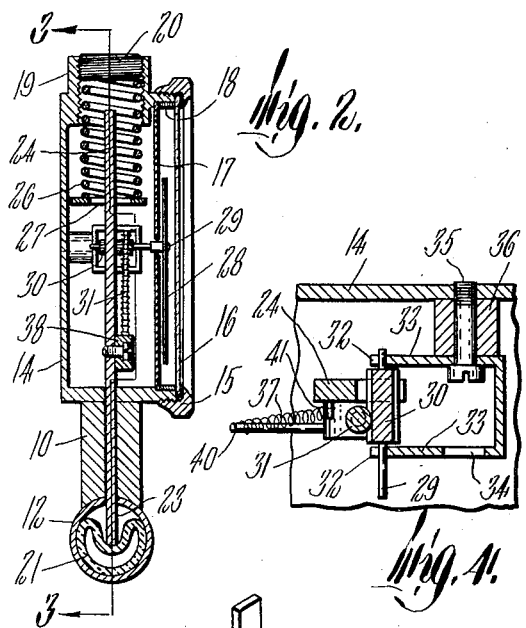
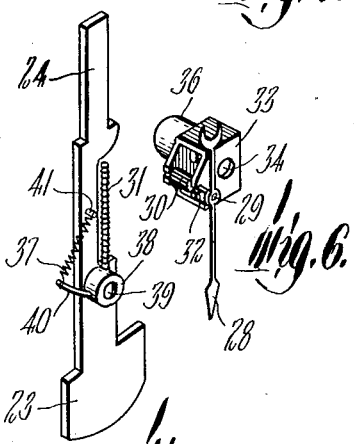
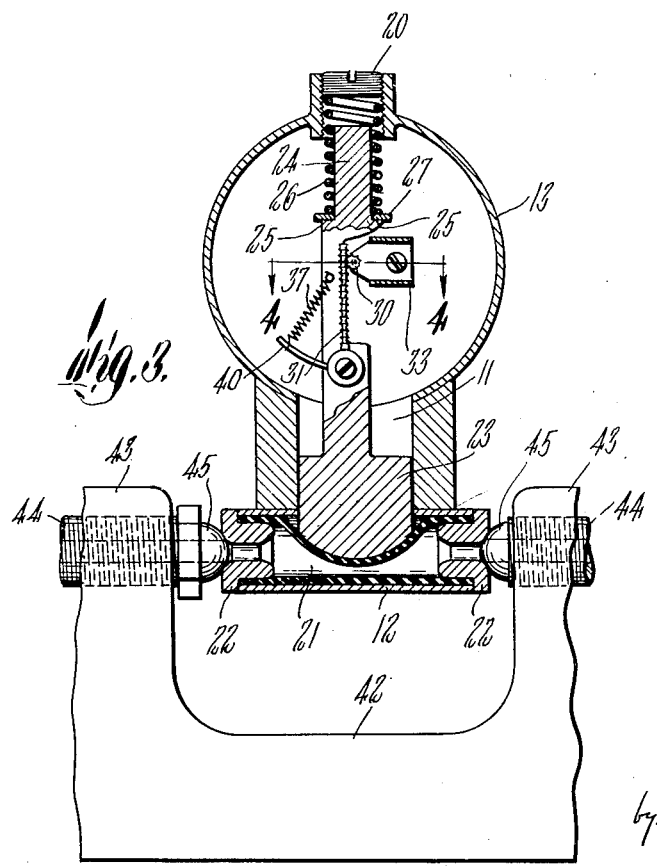
Inventor:
Olof Ohlson,
by Wright, Brown, Quinby & May
Attys.

Patented Aug. 8, 1933

1,921,001

UNITED STATES PATENT OFFICE 1,921,001

PRESSURE GAUGE

Olof Ohlson, Newton, Mass.

Application February 11, 1929. Serial No. 338,931

10 Claims. (Cl. 73—110)

This invention relates to pressure gauges or meters and its object is to provide a measuring instrument of this type adapted to register the pressures of fluids in motion, and adapted also to absorb and equalize pulsations in the fluid. It finds one important field of use in connection with fluids of a viscous character, and particularly those which tend to solidify or thicken when allowed to stand, such, for instance, as the solutions of cellulose compounds from which artificial silk or rayon is made. Without intending to limit the scope of the invention or of the protection which I claim, but rather to explain its utility by reference to a concrete example, I will now briefly describe the functions and need of a pressure gauge in the manufacture of rayon.

The viscous solution is formed into threads, each consisting of a number of minute filaments, by being forced under pressure through numerous fine holes in a spinneret. Pumps are employed for imposing the necessary pressure on the solution and for delivering it to the spinnerets at as nearly uniform a rate as possible. Usually a separate pump is coupled with each spinneret. A filter is interposed between the pump and spinneret to restrain lumps of hardened or excessively thickened solution, which frequently occur in some of the solutions used in this art, as well as to remove foreign matter; and frequently also a closed air chamber or bottle is placed in branch connection with the flow line in order to absorb pulsations of the pump and maintain a steady pressure on the solution, at least when the pump used is of the reciprocating plunger type.

The viscosity of the solutions here referred to is difficult to control, and some compounds become semi-solid if allowed to stand for a few hours, even though not exposed to evaporation. When the compound becomes too thick and stiff, it is liable to tear the cloth which is used as a strainer in the filter, and it blocks the air pressure chamber so that free flow and ebb therein, with transmission of pressure to the confined body of air, is prevented, and the pressure chamber fails in its function of neutralizing pulsations; with the result that the compound may be delivered to the spinneret under a fluctuating pressure and may contain solid or semi-solid masses which may block some of the orifices of the spinneret, with impairment to greater or less extent of the quality of the yarn. The desirability of applying a pressure gauge in the connection between the pump and spinneret, in order to disclose at once the occurrence of the troubles above mentioned, by showing an abnormal pressure, has long been recognized, but hitherto no pressure gauge has been known which will serve the purpose. The gauges of the types heretofore familiar, which include a distortable fluid-receiving member having a single orifice, as the pressure responsive measuring element, are unsuitable because they do not permit continuous traverse through them of the fluid, but retain it in a stagnant condition. Hence when such gauges are used in connection with solutions liable to solidify, they become inoperative when the solution stiffens to the extent that it fails to flow freely under pressure. Such pressure responsive elements cannot be completely cleared of a viscous liquid and their condition becomes worse as the liquid becomes more and more stiff and hard. Gauges thus rendered unserviceable can be restored to serviceable condition only by substitution of a new pressure responsive element and their period of useful life after restoration is very short.

It has been my object to provide a gauge through which the liquid of which the pressure is measured may flow directly, without becoming stagnant, and of which the pressure responsive and pressure measuring means is not liable to be injured by solidifying of the fluid, and the flow passage of which may be quickly and easily cleared if the fluid should harden in it after standing. In the present specification I have disclosed a form of gauge by which this object has been accomplished. The invention consists in the gauge having the principles and characteristics so disclosed, and in equivalent constructions, for the purpose previously outlined and all other purposes and uses to which it may be operatively applied.

In the drawing,—

Fig. 1 is a front elevation of the gauge;

Fig. 2 is a cross section on line 2—2 of Fig. 1;

Fig. 3 is a section on line 3—3 of Fig. 2, in a plane parallel to the face of the gauge;

Fig. 4 is a detail cross section on a larger scale, taken on line 4—4 of Fig. 3; and Figs. 5 and 6 are perspective views of the indicating mechanism of the gauge.

Like reference characters designate the same parts wherever they occur in all the figures.

The casing of the gauge consists of a base portion 10 having a longitudinal slot or passageway 11 in its interior, and to one end of which is rigidly joined a cylindrical tube 12. The length of this tube extends in the direction of the wider dimension of the base. The slot 11 is relatively wide in this direction and relatively narrow in the transverse direction. To the other end of the base is joined a cylindrical box-like structure having side walls 13 of circular outline and a plane rear wall 14. These parts may be made as originally separate structures secured together separably or inseparably, as desired, by any suitable means of connection, or they may be made from an originally integral single piece. The cylindrical wall of the box-like structure, at the open side of the latter, is externally threaded to receive a bezel or retaining ring 15 for a crystal 16, and has an internal shoulder against which a dial 17 is held by a spacing ring 18 between the dial and the crystal. At the opposite side of the cylindrical box from the base 10 is an opening in the cylindrical wall surrounded by an internally threaded lip 19 which receives an adjustable and removable screw threaded plug 20.

A flexible impervious liner tube 21 is contained within the tube casing 12. Such liner may be made of a piece of thick walled rubber tubing (a material which is unaffected by the solutions employed in making artificial silk) or other suitable material, and is of an appropriate diameter externally to fit closely within the tube 12. Tubular plugs 22 are inserted in the ends of the liner to serve as entrance and exit connections for the fluid of which the pressure is to be measured, and to crowd the liner into leakage tight connection at its ends with the tube 12. To perform the latter function the plugs are made slightly larger in external diameter than the unstressed interior diameter of the liner, so that when inserted into the latter they expand it and compress its walls against the outer tube, their inserted ends may be beveled for easy entrance, and their outer ends are preferably provided with flanges to limit penetration.

A plunger or pusher 23 fits slidingly in the slot 11 and may protrude from the base 10 into the interior of sleeve 12. Such slot is thus a guideway for the plunger, and the part of the casing which contains it forms the guiding portion of the casing. The plunger also extends from the opposite end of the base across the enclosure within the wall 13 toward the opening in the latter. Its end next to the sleeve 12 is convex with a gradual curvature so that it may indent and collapse the liner when forced toward the latter, as shown in the drawing; and it has sufficient thickness to indent the liner without cutting it. Its opposite end is reduced in width, forming a shank 24 and shoulders 25. A spring 26 surrounds this shank and is confined between the shoulders and the plug 20, the latter serving is an adjustable reaction abutment, the adjustment of which enables the spring to press the plunger more or less forcibly and to a greater or less extent into the space within tube 12. An annular washer 27 is interposed between the shoulders 25 and the adjacent end of spring 26.

It will be seen that the plunger and its spring, having been adjusted to indent the liner 21 at one side, thus largely obstruct the passageway through tube 12. The liquid flowing through this tube tends to expand the liner to its normal form and displace the plunger, the resultant displacement being proportional to the pressure of the fluid. Such displacement is indicated by a pointer or hand 28 movable over the dial 17 and mounted on a staff or shaft 29 at the center of the dial. Said staff carries a pinion 30 in mesh with a rack 31 carried by the plunger.

While the rack and pinion gearing between the plunger and pointer may be made in various forms, I have devised and shown herein a mechanism which has practical advantages from a standpoint of simplicity, economy of manufacture, and ease of assemblage. The bearings for the staff are provided by open notches 32 in plates 33 which are spaced apart from one another but connected rigidly together. In effect these plates are opposite side walls of a cubical metal box which is open at one side to admit the pinion 30 between said walls. One of the walls has an opening 34 to admit a screw driver by which to turn the attaching screw 35 which passes through the opposite wall 33 and through a spacing block 36 into the back wall 14 of the case.

The pinion 30 has a length approximately equal to the space between the walls 33, so that it enters such space freely but narrowly limits the possible endwise movement of the staff. It is held in this space and the staff retained in its bearings by pressure exerted through the rack 31 by a spring 37.

The rack is preferably made as a cylindrical rack, that is, as a rod having a series of equally spaced encircling ribs or beads, whereby it may be secured to its holder without need of taking care to see that its teeth are properly faced toward the pinion, as would be necessary in case of an ordinary rack having teeth at one side only. One end of the rack bar is secured in a collar 38, conveniently by being screwed into it, which is rotatable about a pivot stud 39 attached to the plunger and conveniently made as a screw. An arm 40 projects from the side of the collar 38 and is connected to one end of the spring 37, the other end of which is anchored by a pin 41 to the plunger. The plunger 23 is cut away on the side next to the pinion sufficiently to avoid interferences therewith or with the bearings for staff 29.

It will be apparent that the liner tube 21 within the casing tube 12 provides a direct conduit or passageway for the fluid and prevents access of the fluid to any spaces or into contact with any moving parts where its presence after hardening would be detrimental in any degree. The minimum opportunity is given for obstruction of the gauge by hardening of the fluid; but if the passageway should happen to be stopped up, or the flexible liner unduly stiffened by this cause, the difficulty may be easily remedied by removing the liner and substituting a fresh one. Such substitution involves practically no difficulty or expense, for the liners cost almost nothing and can be removed and replaced with the greatest ease. At the same time a true measure of the pressure existing in the fluid is given by the gauge, the scale of which may be calibrated to read accurately in terms of standard units of pressure or according to an arbitrary scale appropriate to the particular circumstances in which the gauge is used.

The plunger is preferably made of such width, and capacity for displacement, and the tube 12 is made so large that the part of the liner on which the plunger bears has a large volumetric displacement between its collapsed and distended positions. It results from this fact that the gauge itself serves as a means for absorbing and neutralizing pulsations caused by the pump and causing a steady onward flow of the fluid. Such pulsations are registered by the gauge indicator, and the pressure effects of the pulsations, whether normal or abnormal, show at once if the line is satisfactorily clear or is obstructed. When used in a system supplied by a plunger pump, this gauge dispenses with the need of the air cushion chamber heretofore used.

A fixture suitable for mounting the gauge in a flow line, being one of many means which may be used for the purpose, is shown in Fig. 3. Here a base 42 is provided with arms 43 embracing a space in which the tube 12 of the gauge casing may be placed lengthwise. Pipe sections 44 are screwed into alined tapped passageways through the arms 43 and are provided with spherical or tapered heads 45 which enter beveled enlargements of the passageways through the plugs 22 at the outer ends of the latter. Such pipe sections may be readily retracted and advanced to permit insertion and removal of the gauge and are adapted to make leakage tight joints with the tubular plugs 22.

It is to be understood of course that the same gauge herein shown and described, and equivalent devices embodying the same principles, may be used in various other situations and for other specific purposes than that of artificial silk spinning, wherefore my protection is not limited to the specific purposes and uses hereinbefore described.

What I claim and desire to secure by Letters Patent is:

1. A pressure indicator comprising a conduit for fluid including a collapsible tube, a yieldingly loaded pusher arranged to press on said tube at one side thereof to collapse it and being movable by distention of the tube from its collapsed condition, and means for measuring, by the movement and momentary position of such pusher the fluid presure within the conduit.

2. A pressure indicating instrument comprising a casing, a tube within said casing, open and smooth throughout for transmission of liquid and being of flexible construction throughout, yieldable force applying means carried by said casing acting on said tube with collapsing effect when a low fluid pressure condition exists within the tube and being displaceable with distention of the tube against action of said force applying means by higher internal fluid pressures, and indicating means associated with said force applying means for showing distention of the tube from its collapsed condition.

3. A pressure indicating instrument as set forth in claim 2 in which the force applying means and indicating means are outside of the tube and have no liquid receiving communication therewith.

4. A pressure indicating instrument comprising in combination a flexible and collapsible tube for fluid, a yeildingly loaded pusher external to said tube arranged and guided movably to apply collapsing pressure thereto and to be displaced by distention thereof, and an index actuated by said follower for movement simultaneously therewith.

5. A pressure gauge comprising a casing having a tubular portion open from end to end and a guiding portion opening into said tubular portion, a flexible and collapsible lining tube within said tubular portion, a plunger guided by said guiding portion and bearing on the side of said liner, a spring pressing on said plunger and forcing it against the liner with collapsing effect on the latter, and an index associated with and actuated by said plunger.

6. A pressure gauge comprising a casing having a tubular portion open from end to end and a guiding portion opening into the interior of said tubular portion, a flexible and collapsible liner tube within said tubular portion, a plunger ocupying said guiding portion and extending thence into bearing on the side of said liner, a spring pressing on said plunger and forcing it against the liner with collapsing effect on the latter, a rack carried by said plunger, a revoluble pinion mounted in a stationary location in the casing meshing with said rack, and a pointer connected and revoluble with said pinion.

7. In a gauge of the character described, a casing comprising a base having a tubular member at one end and a guideway opening laterally into said tubular member, a flexible liner tube in said tubular member, a pusher occupying and movable in said guideway, and means for pressing said pusher against the side of said liner.

8. In a gauge, a casing having a tubular member at one end and an interior guideway opening through the side of said tubular member, a flexible lining tube ocupying said member, tubular plugs removably occupying the ends of said lining tube and having an exterior diameter less than the interior diameter of said tubular member but greater than the unstressed interior diameter of the lining tube, a movable pusher occupying said guideway and loaded so as to press against the side of the lining tube, and means cooperating with said pusher to indicate fluid pressure existing within the lining tube.

9. In a gauge of the character described, a rigid tubular member, a flexible liner in said member, and means for securing the liner leakage tight in the tubular member comprising a plug inserted into the end of the liner and having an external diameter greater than the unstressed internal diameter of the liner and less than the internal diameter of the tubular member.

10. In a gauge of the character described, a rigid tubular member, a flexible liner in said member, and means for securing the liner leakage tight in the tubular member comprising a plug inserted into the end of the liner and having an external diameter which is less than the internal diameter of the tubular member but the difference between such diameters is less than twice the thickness of the liner walls.

OLOF OHLSON.